US 12,450,019 B2

(12) United States Patent
Morales et al.

(10) Patent No.: US 12,450,019 B2
(45) Date of Patent: Oct. 21, 2025

(54) MANAGEMENT OF PRINTING OPERATIONS USING ENHANCED HOT FOLDERS

(71) Applicant: Kyocera Document Solutions Inc., Osaka (JP)

(72) Inventors: Javier A. Morales, Rochester, NY (US); Timothy F. Donahue, Mentor, NY (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/491,158

(22) Filed: Oct. 20, 2023

(65) Prior Publication Data
US 2025/0130747 A1    Apr. 24, 2025

(51) Int. Cl.
*G06F 3/12* (2006.01)
(52) U.S. Cl.
CPC ............ *G06F 3/127* (2013.01); *G06F 3/1204* (2013.01); *G06F 3/1284* (2013.01)
(58) Field of Classification Search
None
See application file for complete search history.

(56) References Cited

U.S. PATENT DOCUMENTS

| | | | |
|---|---|---|---|
| 9,977,630 B2 | 5/2018 | Kanamoto et al. | |
| 2005/0237572 A1* | 10/2005 | Mori | G06F 40/103 358/1.17 |
| 2006/0026121 A1* | 2/2006 | Terao | G06F 21/608 |
| 2012/0224221 A1* | 9/2012 | Mochizuki | G06F 3/1261 358/1.15 |
| 2017/0255887 A1* | 9/2017 | DeLay | H04L 63/10 |
| 2019/0107977 A1* | 4/2019 | Yokoohji | G06F 3/1288 |
| 2021/0055937 A1* | 2/2021 | Zhan | G06F 9/4408 |
| 2021/0319179 A1* | 10/2021 | Muffat | G06F 21/6245 |

* cited by examiner

*Primary Examiner* — Thomas D Lee
(74) *Attorney, Agent, or Firm* — Millen, White, Zelano & Branigan P.C.; William F. Nixon

(57) ABSTRACT

Printing operations may use a hot folder. The hot folder includes printing instructions that are applied to print jobs within the hot folder. A file for the print job is stored in the hot folder. More than one file can be retained. The hot folder invokes a script to be executed on the file. A temporary folder is created corresponding to the file. The file is stored in the temporary folder. The temporary folder has a unique filename. The script is executed within the temporary folder and the execution is monitored to its completion. When the script is done executing, the temporary folder is deleted. Separate temporary folders are generated for each file in the hot folder.

18 Claims, 6 Drawing Sheets

MANAGEMENT OF PRINTING OPERATIONS USING ENHANCED HOT FOLDERS

FIELD OF THE INVENTION

The present invention relates to managing hot folders during printing operations to enable the execution of scripts.

DESCRIPTION OF THE RELATED ART

Use of hot folders may be common in production printing environments. The hot folders enable loose integration between disparate systems in the production printing environment. In order to facilitate this feature, hot folders include the ability to trigger user-written scripts. The scripts should be simple or take care to only use resources that reside outside the hot folders. This constraint is due to the fact that, while the hot folders include the ability to trigger scripts, they are not really aware of what the script is doing. Problems may occur if the script creates a temporary file or if the script stages files for submission as the hot folder may pick these files for processing.

These problems may be alleviated by using resources outside of the hot folder. This remedy, however, represents a significant security risk as the script is then given potentially unfettered access to the system. Further, a problem may occur with resource conflicts if multiple instances of a script that performs the above operations are executed at the same time.

SUMMARY OF THE INVENTION

A method for performing printing operations using a hot folder is disclosed. The method includes receiving, at the hot folder associated with a printing device, a file for a print job to be printed at the printing device. The method also includes processing the print job at a digital front end (DFE) of the printing device. The method also includes invoking a script to be executed using the file within the hot folder. The method also includes creating a temporary folder corresponding to the file. The method also includes storing the file to the temporary folder with the script. The method also includes executing the script within the temporary folder storing the file. The method also includes monitoring execution of the script. The method also includes deleting the temporary folder when the script is done executing.

A method for performing printing operations using a hot folder is disclosed. The method includes receiving, at the hot folder associated with a printing device, a plurality of files for print jobs to be printed at the printing device. The method also includes processing the print jobs at a digital front end (DFE) of the printing device. The method also includes invoking a script to be executed using the plurality of files within the hot folder. The method also includes creating a temporary folder for each of the plurality of files. Each temporary folder includes a unique filename. The method also includes storing each of the plurality of files to the respective temporary folder with the script. The method also includes executing the script within the temporary folders storing the plurality of files. The method also includes monitoring execution of the script within the temporary files. The method also includes deleting each of the temporary folders when the script is done executing in the temporary folder.

A printing system is disclosed. The printing system includes a printing device having a digital front end (DFE). A storage device accessible by the DFE. The storage device includes a processor and a memory connected to the processor. The memory stores instructions that, when executed on the processor, configures the storage device to receive, at the hot folder associated with the printing device, a file for a print job to be printed at the printing device. The storage device also is configured to process the print job at the DFE of the printing device. The storage device also is configured to invoke a script to be executed using the file within the hot folder. The storage device also is configured to create a temporary folder corresponding to the file. The storage device also is configured to store the file to the temporary folder with the script. The storage device also is configured to execute the script within the temporary folder storing the file. The storage device also is configured to monitor execution of the script. The storage device also is configured to delete the temporary folder when the script is done executing.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining with the scope of the disclosed embodiments.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments enhance hot folders in order to provide functionality to enable more sophisticated scripts while ensuring that a script is unable to access the broader system. The hot folder configuration for triggering the script may include the ability to run the script as a specific user. The user may be a service account with extremely limited privileges. When the script executes, it will be executed using the selected user that will in turn limit the script's access to the printing system.

In addition, the disclosed embodiments move the submitted files, the script, and any other resources to a temporary folder with a unique filename as part of the script execution. The hot folder monitor will not attempt to process any content from this temporary folder.

This feature will allow the script to stage files for processing. It also will allow the script to create any temporary content that it may need as part of the execution. The disclosed embodiments will trigger the script so that it executes from this unique location.

The disclosed embodiments enable execution of multiple instances of the script as each instance will execute from its own uniquely-named folder. The script, for example, may be written to create a work-in-progress folder for temporary content. Each script instance creates this folder in a different, uniquely-named folder multiple instances can execute concurrently without interfering with each other.

Once the script completes execution, the disclosed embodiments remove the uniquely-named folder and all of its contents. This feature will prevent accumulation of abandoned files that may be the result of a poorly written script. Scripts are user-created so the quality of each script may vary. In an alternate embodiment, the disclosed embodiments may leave the submitted file in the hot folder and use the uniquely-named folder as the WIP folder. The configuration to invoke the script would use a variable that would resolve to the uniquely-named folder that the script would then be able to use for staging files or for creating temporary content as part of its execution.

Figure 1A:
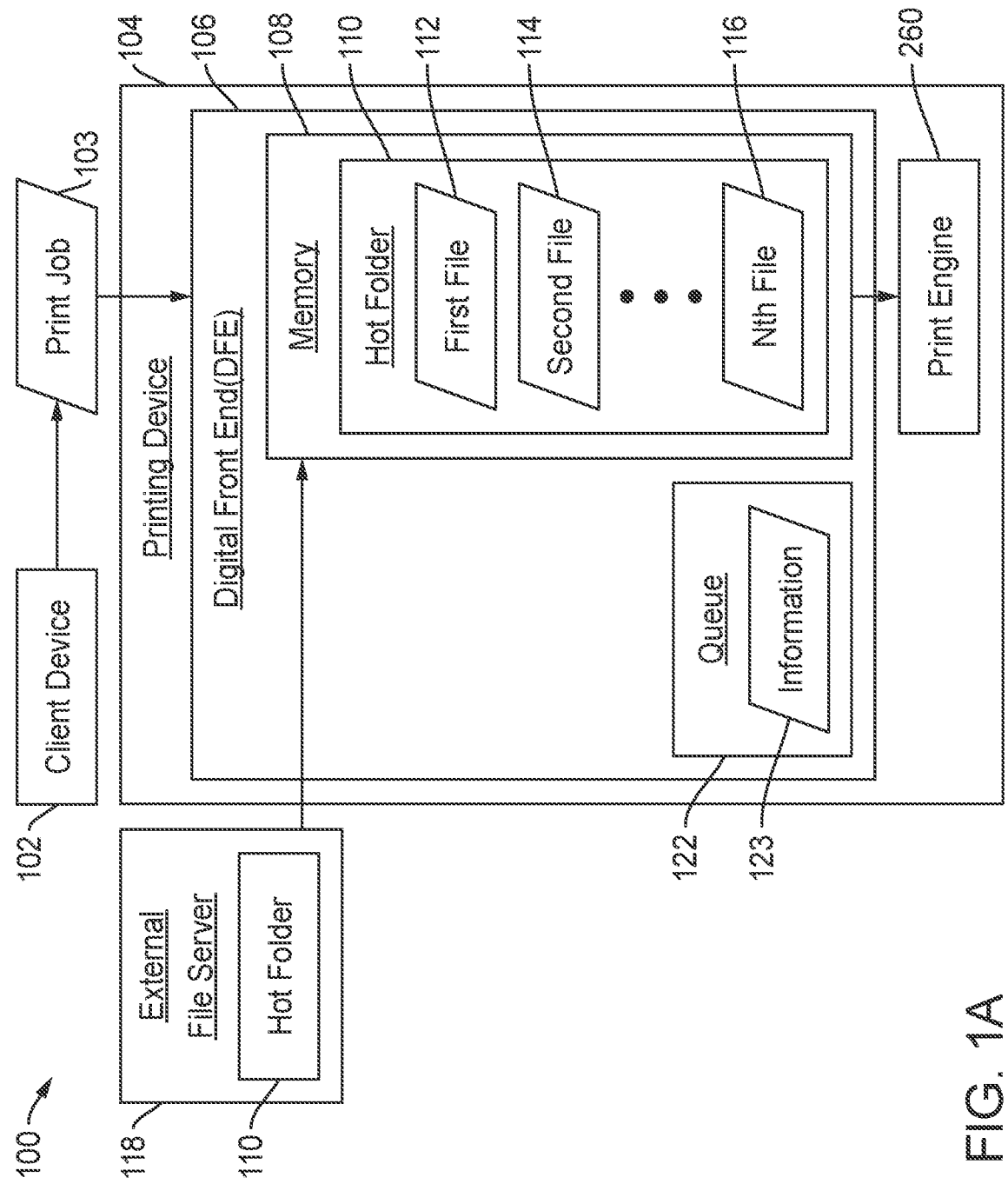
FIG. 1A illustrates a printing system having a printing device for printing documents using a hot folder according to the disclosed embodiments.

FIG. 1A depicts a printing system 100 for printing documents using a hot folder 110 according to the disclosed embodiments. Printing system 100 includes printing device 104. Printing device 104 is disclosed in greater detail below. Printing device 104 may receive one or more print jobs 103 within printing system 100. For example, client device 102 may generate and send print job 103 to printing device 104. In some embodiments, printing device 104 may be a production printing device in that print jobs are provided through client device 102, which is attached to the printing device. Such a print job may require 1000s of pages or even 100,000 pages or more.

Printing device 104 may receive print job 103 as it is processing and printing current print jobs. Current jobs may use different paper or media than print job 103. As such, printing device 104 may include a plurality of paper trays to supply papers of various types, sizes, weights, and the like.

As print jobs are received, DFE 106 may process the print jobs and store jobs waiting to be printed. Embodiments of DFE 106 are disclosed in greater detail below by FIG. 1B. In addition to the features disclosed in FIG. 1B, DFE 106 also may include memory 108. Memory 108 may store files being processed for delivery to print engine 260 for printing. Preferably, the files may be stored in a hot folder 110. DFE 106 may utilize functionality to allow operators to utilize hot folder 110. Memory 108 may store one or more hot folders 110 to allow operators to print by saving print jobs to a hot folder 110 over printing system 100.

Hot folder 110 may have an associated set of print instructions, such as print quantity, media, and finishing, such that when a particular print job is saved to the hot folder, that hot folder's associated print instructions will be used when providing the processed file for the print job to print engine 260. Some file types, such as postscript files and some other Page Description Language (PDL) file types, allow an operator to specify comprehensive print instructions, including print quantity, print media, and print finishing, via embedded print ticketing. Operators may not know how a print job should be set up, in order to include the print instructions. Thus, some operators may, instead, save files to hot folders, in order to apply predefined print instructions.

In order to provide flexibility in print instructions for multiple jobs, many hot folders 110 may be created. Thus, memory 108 may include more than one hot folder 110. Each hot folder may specify one or more different print quantities, print media, print finishing, and the like. Hot folder 110 includes files for the received print jobs within DFE 106. Some hot folders may be used for single file submission, but other hot folders are used to process multiple files. Thus, hot folder 110 includes first file 112, second file 114, up to Nth file 116. Nth file 116 may represent the latest file placed in hot folder 110. Other files may be included between second file 114 and Nth file 116. These files are provided to print engine 260 for printing within printing device 104.

In some embodiments, DFE 106 may have limited resources in order to store and process files for print jobs. Printing system 110 may be configured to include an external file server 118 that supports hot folder 110. Instead of being within memory 108 of DFE 106, hot folder 110 is located at external file server 118, where it may take advantage of additional memory storage. First file 112, second file 114, up to Nth file 116 may be within hot folder 110 at external file server 118, but not shown in FIG. 1A. This embodiment may allow printing system 100 to store an unlimited number of spool files.

Printing system 100 or DFE 106 may track the files in an external hot folder 110 on a queue 122 with minimal information 123. Alternatively, DFE 106 may add a subset of the files in external hot folder 110 to queue 122. In some embodiments, DFE 106 may only transfer an active job to its memory 108 for rendering by RIP firmware 290. For DFEs with limited storage, the disclosed embodiments may split the print job into individual pages in hot folder 110 then transfer a limited number of pages to memory 108. External file server 118 also may enable to ability to manipulate or process jobs in a sophisticated way that may be only available to server DFEs.

Figure 1B:
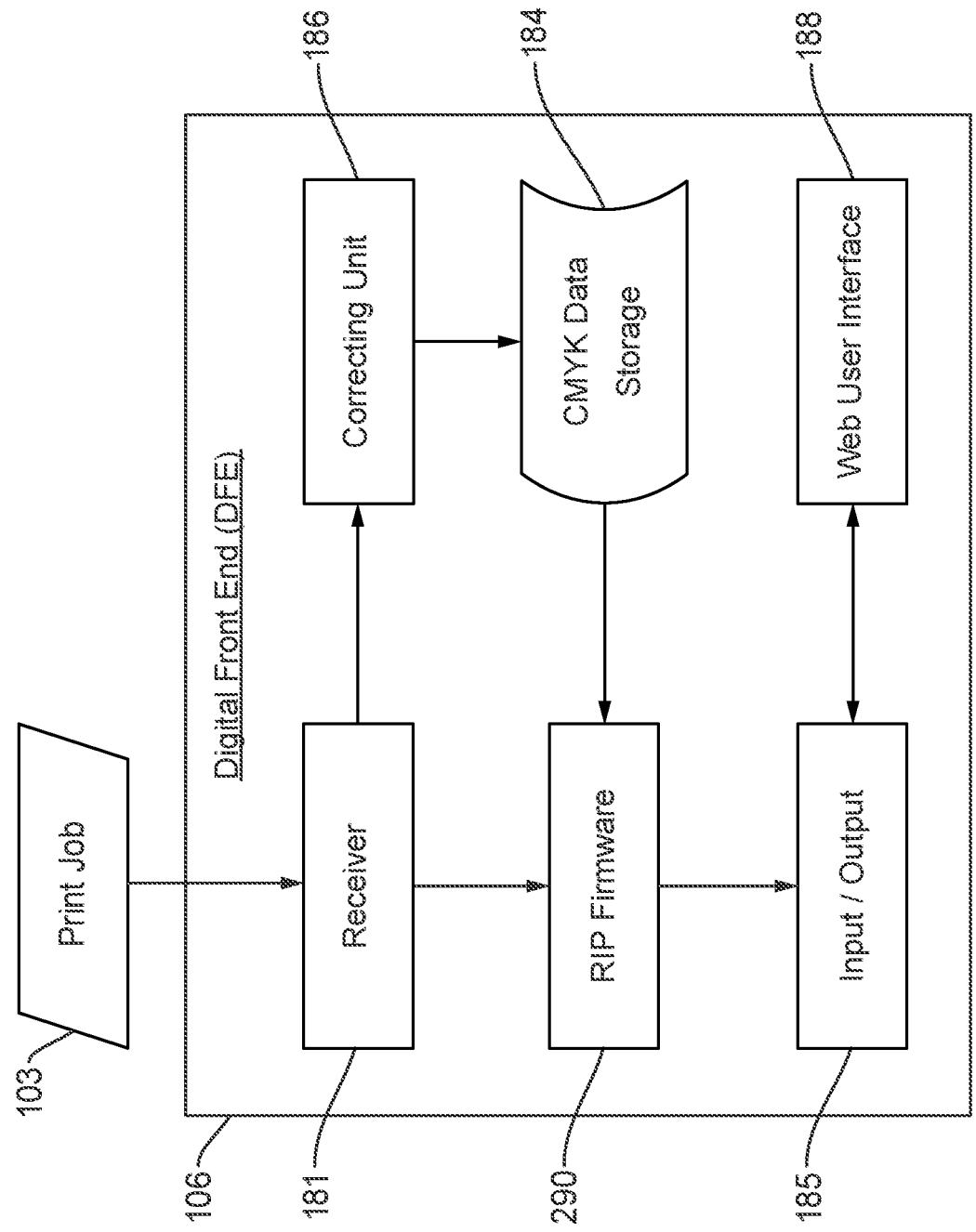
FIG. 1B illustrates a digital front end (DFE) for a printing device according to the disclosed embodiments.

FIG. 1B depicts a block diagram of DFE 106 according to the disclosed embodiments. DFE 106 includes a receiver 181, a RIP firmware 290, a CMYK data storage 184, an input/output connector 185, and a correcting unit 186. Additional components within DFE 106 may be implemented, as disclosed in FIG. 1A.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 may be transmitted within printing system 100 via input/output connector 185. The print condition information and the print medium type, as well as the rendering data, may be transmitted to a selected printing device within printing system 100. As disclosed above, the rendered data may be in a file format acceptable for a printing device such that the print job is provided directly to the print engine of the printing device.

DFE 106 also includes web user interface 188 that may communicate with other devices within printing system 100, if it is located at a separate device, using, for example, input/output connector 185. Web user interface 188, or web application, allows a user of the DFEs of other printing devices to interact with content or software running on DFE 106.

Figure 2:
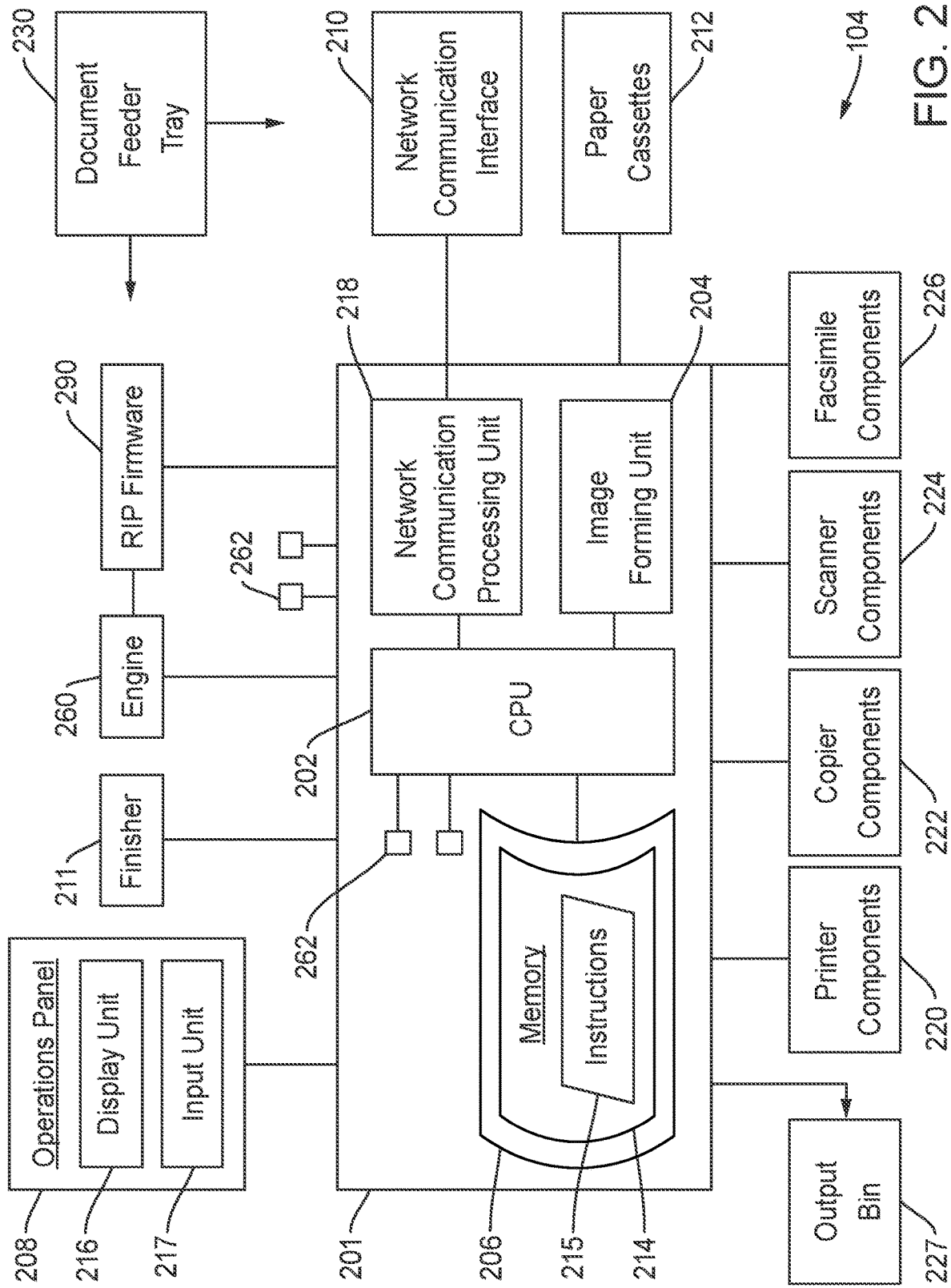
FIG. 2 illustrates a block diagram of components of the printing device for use within the printing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from DFE 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. The term of feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from DFE 106, if applicable. DFE 106 may send calibration and paper catalog information to printing device 104 for display. For example, the operator at DFE 106 may send a calibration to printing device 104. Printing device 104 displays paper type and any other information needed to complete the calibration.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device. Memory unit 206 may store the history of failure events and occurred errors with a timestamp of each error.

Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from DFE 106 as well as other devices within system 100.

Figure 3:
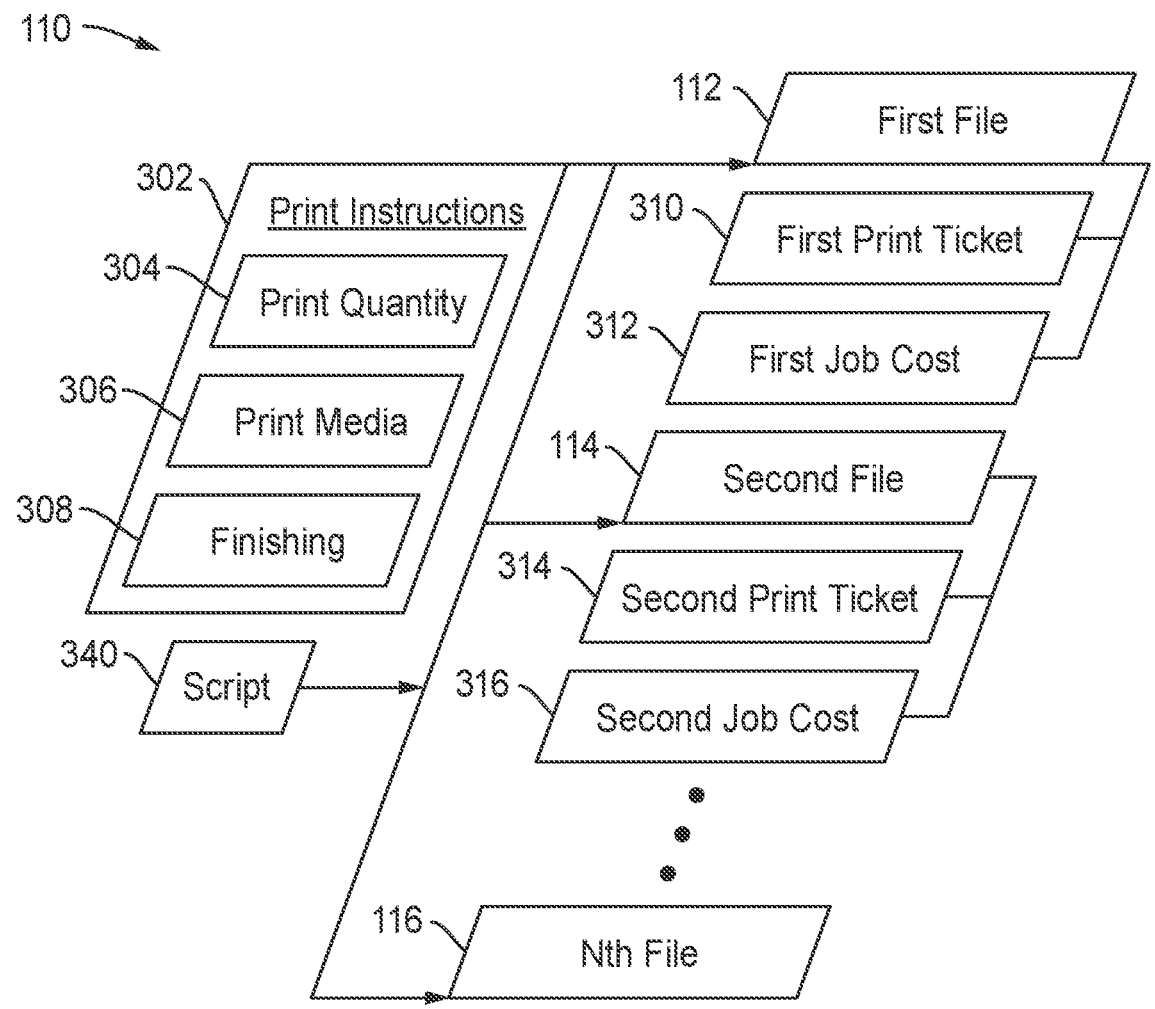
FIG. 3 illustrates a block diagram of the hot folder having a plurality of files according to the disclosed embodiments.

FIG. 3 depicts a block diagram of hot folder 110 having a plurality of files according to the disclosed embodiments. As noted above, hot folder 110 may be one of several hot folders stored in memory 108 of DFE 106. The hot folders may server as spool directories within DFE 106. As such, files for print jobs may be monitored and accessed until sent for printing to print engine 260. An operator may monitor hot folder 110 and take actions based on the content of the hot folder.

As disclosed above, hot folder 110 may include first file 112, second file 114, up to Nth file 116. The operator may access any one of these files prior to being printed. Hot folder 110 also includes print instructions 302. Each hot folder 110 has an associated set of print instructions 302 such that when a file is saved to the hot folder, print instructions 302 will be implemented when printing the print job.

Print instructions 302 serve as default print instructions for print jobs saved to hot folder 110. Values for print instructions 302 differ between different hot folders 110. For example, print instructions for one hot folder may specify a certain paper media to use while print instructions for another hot folder may specify a different paper media to use for printing operations. The operator may select which set of print instructions 302 to use for a print job and save it to the appropriate hot folder 110. Alternatively, a hot folder may not include any print instructions.

Print instructions 302 associated with hot folder 110 may include a plurality of instructions. For example, print quantity instruction 304 may be included. Print quantity instruction 304 may include a print quantity property and a print quantity value, such as 1000 copies. Print media instruction 306 may include a media property and a media value, such as A4, 70 GSM. Print media instruction 306 may specify a size and type of media to be used for printing operations. Finishing instruction 308 may include a finishing property and a finishing value, such as one for a booklet. Other types of print instructions may be implemented by hot folder 110.

Print instructions 302 are added to first file 112, second file 114, up to Nth file 116 for printing operations. Further, these files are retained in hot folder 110 until they complete processing within DFE 106. Additional job files also may be stored with the files in hot folder 110. For example, first print ticket 310 and first job cost data 312 may be stored with first file 112. Second print ticket 314 and second job cost data 316 may be stored with second file 114. The data and information for first print ticket 310 differs from second print ticket 314 while first job cost data 312 also differs from second job cost data 316. Thus, in additional to commonly shared print instructions 302, the files within hot folder 110 may include files or data specific to each print job.

Hot folder 110 also may include script 340. Script 340 may be a program or sequence of instructions that is interpreted or carried out by another program rather than by a computer processor. In the disclosed embodiments, script 340 may link to resources outside hot folder 110 to automate the execution of tasks. Hot folder 110 includes the ability to trigger script 340 along with print instructions 302. Script 340 may be triggered for all files within hot folder 110. Further, more than one script 340 may be used in operations regarding hot folder 110.

Figure 4:
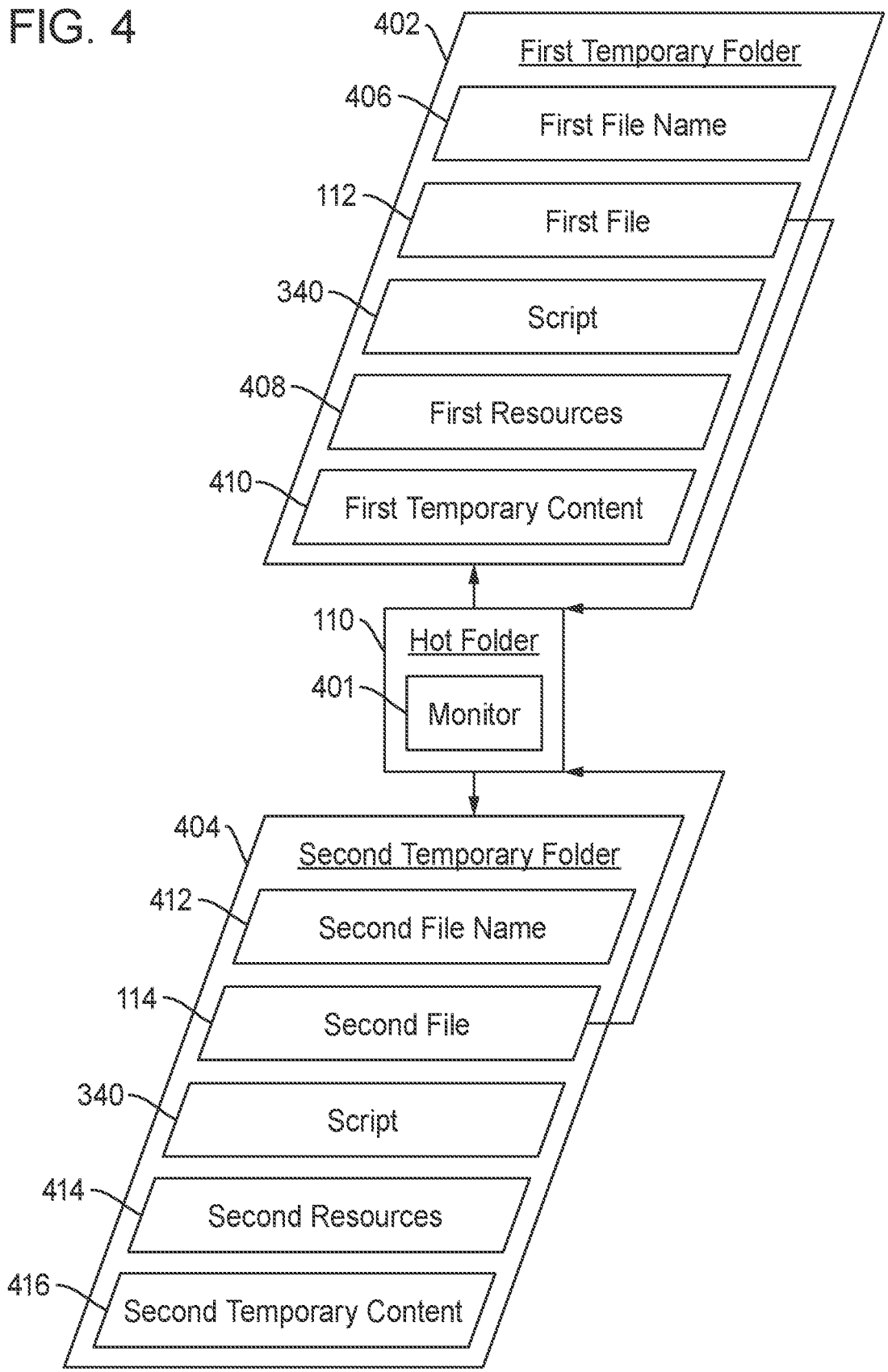
FIG. 4 illustrates a block diagram of a hot folder implementing a script within the printing system according to the disclosed embodiments.

FIG. 4 depicts a block diagram of hot folder 110 implementing script 340 within printing system 100 according to the disclosed embodiments. As disclosed above, hot folder 110 may be configured to trigger script 340 and run it as a specific user. Preferably, this user is a service account with extremely limited privileges. Script 340 executes using the selected user that will, in turn, limit the access of the script to the printing system or DFE 106.

As disclosed above, script 340 may not fully execute within hot folder 110. Hot folder 110, therefore, may open temporary files apart from the hot folder to perform the script operations. Hot folder 110 may include hot folder monitor 401, which manages the files within the hot folder. For example, monitor 401 may indicate when files are ready for printing and remove the files from hot folder 110. It also may open the temporary folders within DFE 106 or external file server 118. Monitor 401 may determine when execution of script 340 within the temporary folders is complete in order to return control back to the files in hot holder 110.

For example, the disclosed embodiments create first temporary folder 402 and second temporary folder 404. Monitor 401 will not process any content within folders 402 and 404. Monitor 401 may interact with folders 402 and 404 to determine when the execution of script 340 within each folder is complete. At that time, monitor 401 may remove folders 402 and 404 from DFE 106 or external file server 118.

Hot folder 110 will trigger execution of script 340. A separate temporary folder is created for each file within hot folder 110. Thus, first temporary folder 402 is created for first file 112. First temporary folder 402 also includes a unique filename to indicate the folder within DFE 106, shown as first filename 406. First temporary folder 402 also includes script 340, first resources 408, and first temporary content 410. First resources 408 may be those resources used in execution of script 340. Script 340 may link to these resources, which are not part of hot folder 110.

First temporary content 410 may be generated by script 340 as part of the execution. Script 340 is triggered to execute from first temporary folder 402, which is a unique location within printing system 100. Script 340 may be written to create a WIP folder for first temporary content 410. This feature allows multiple temporary folders to be created and script 340 executed concurrently in each without interfering with each other.

Second temporary folder 404 also is created for second file 114. Second temporary folder 404 includes second filename 412, which is a unique filename different from first filename 406. Second temporary folder 404 also includes second file 114 and script 340. It also includes second resources 414 and second temporary content 416. Second resources 414 may be similar to first resources 408, but kept in the separate temporary folders.

Although not shown, a temporary folder would be created for each file in hot folder 110 up to Nth file 116. Each temporary folder would have its own filename to keep each folder distinct from the other within printing system 100. This feature allows script 340 to execute in each temporary folder without the need to interact with elements outside the folder. This feature also enables execution of multiple instances of script 340 as each instance will execute from its unique temporary folder. In some embodiments, more than one script may be executed. For example, an additional script within hot folder 110 would result in two temporary folders for each file.

Once script 340 completes execution within a temporary folder, the temporary folder is closed and removed from printing system 100. The file within the temporary folder may be brought back to hot folder 110. Monitor 401 may close the folders. For example, script 340 may finish execution in second temporary folder 404 before operations in first temporary folder 402. Second temporary folder 404 is closed and deleted along with second filename 412, second resources 414, and second temporary content 416. Second file 114 may be returned to hot folder 110. Once script 340 is done in first temporary folder 402, this folder is closed and deleted along with its contents. This feature prevents accumulation of abandoned files and content that may be the result of a poorly written script and cluttering of DFE 106 with multiple folders and data.

Alternatively, the disclosed embodiments may leave the submitted file in hot folder 110 and use the temporary folder as a WIP folder. Thus, for example, when script 340 is done processing in first temporary folder 402, the folder may be used as a WIP folder for processing operations regarding first file 112. This feature may allow first file 112 to be printed using print instructions 302 of hot folder 110 when designated but also allow other operations to occur for the first file until that time. The configuration to invoke script 340 may use a variable that would resolve to first temporary folder 402 that the script would then be able to use for staging files or creating first temporary content 410 as part of its execution.

Figure 5:
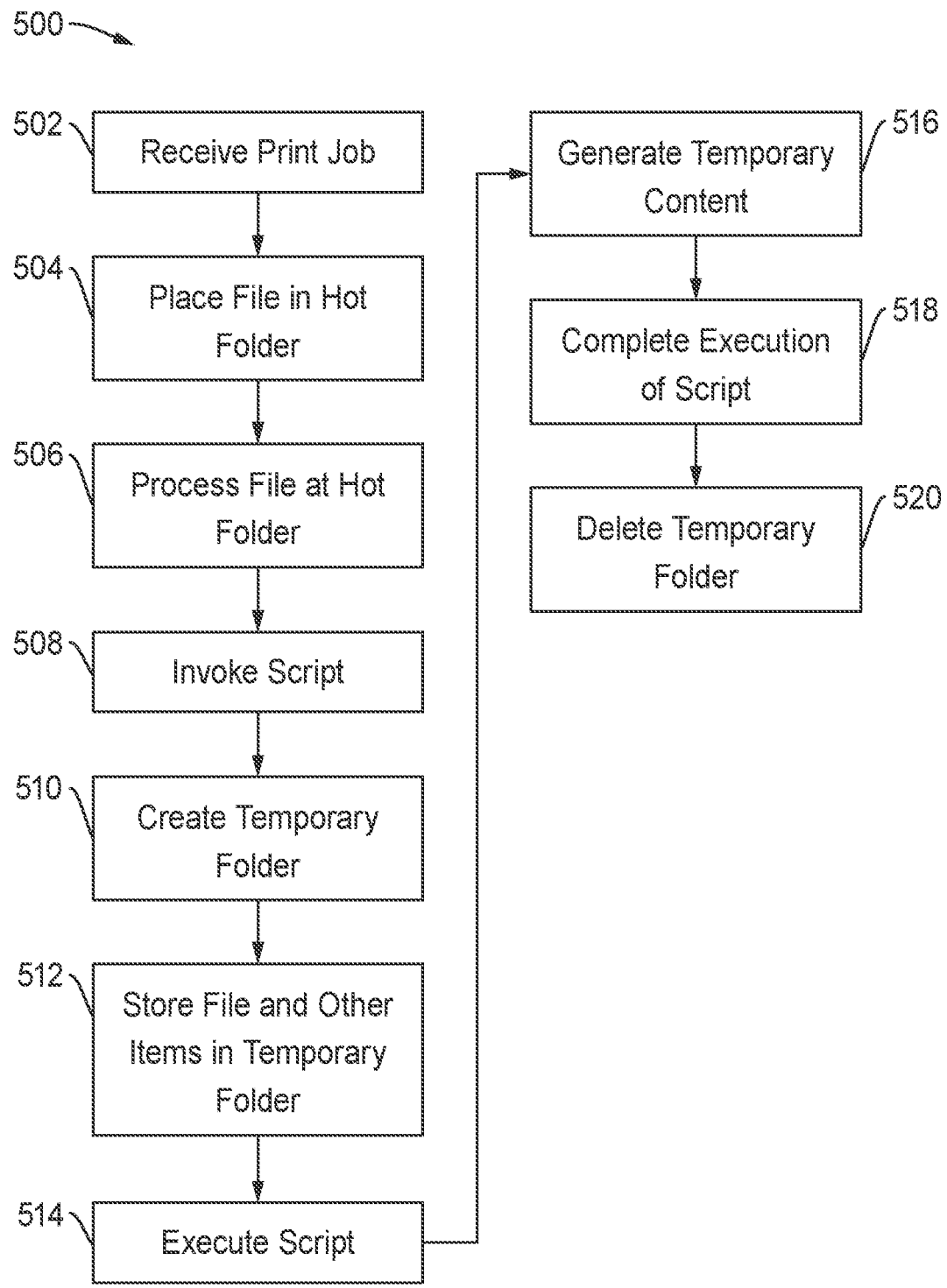
FIG. 5 illustrates a flowchart for performing printing operations using a hot folder that executes a script according to the disclosed embodiments.

FIG. 5 depicts a flowchart 500 for performing printing operations using hot folder 110 that executes script 340 according to the disclosed embodiments. Flowchart 500 may refer to FIGS. 1A-4 for illustrative purposes. Flowchart 500, however, is not limited to the embodiments disclosed by FIGS. 1A-4.

Step 502 executes by receiving print job 103 at printing device 104. A print ticket for print job 103 may instruct the disclosed embodiments to use hot folder 110 in printing operations. Step 504 executes by placing a file, such as first file 112, for print job 103 into hot folder 110. When printing, first file 112 will be printed with print instructions 302 of hot folder 110.

Step 506 executes by processing first file 112 at hot folder 110. Monitor 401 may indicate that first file 112 is to be processed for printing. Preferably, first file 112 is processed at DFE 106. As part of the processing, a script 340 may be triggered by hot folder 110. Step 508 executes by invoking script 340 to be executed using first file 112 within hot folder 110. As script 340 may not execute within hot folder 110, the disclosed embodiments perform additional operations.

Step 510 executes by creating a temporary folder for executing script 340. Using the above example, first temporary folder 402 is created for first file 112 and script 340. First temporary folder 402 includes a first filename 406, which is unique in printing system 100. Step 512 executes by storing first file 112, script 340, and first resources 408 in first temporary folder 402. This instance for executing script 340 is unique from other instances for other files within hot folder 110.

Step 514 executes by executing script 340 within first temporary folder 402 storing first file 112. Script 340 may execute using first file 112 and first resources 408. Step 516 executes by generating first temporary content 410 as part of the execution of script 340. Temporary content 410 may be used in completion of script 340.

Step 518 executes by completing execution of script 340 within first temporary folder 402. Monitor 401 may monitor the script execution without interfering with the processing. Step 520 executes by deleting first temporary folder 402 from DFE 106 and printing system 100. Alternatively, first temporary folder 402 may be kept to store first temporary content 410 and to be used as a WIP folder.

In some embodiments, more than one temporary folder is created. If hot folder 110 includes multiple files to be printed, then a separate, unique temporary folder is created for each file, as disclosed above. As script 340 is done executing within each folder, the respective folder is deleted from printing system 100. It should be noted that script 340 is executed but is unable to access the broader printing system or components within DFE 106. Resources are kept in the temporary folder without access to hot folder 110.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for performing printing operations using a hot folder, the method comprising:
   receiving, at the hot folder associated with a printing device, a file for a print job to be printed at the printing device;
   processing the print job at a digital front end (DFE) of the printing device;
   invoking a script to be executed using the file within the hot folder;
   creating a temporary folder corresponding to the file, wherein the temporary folder is separate from the hot folder within the DFE;
   storing the file to the temporary folder with the script;
   suspending processing of the file within the hot folder when the temporary folder is active;
   executing the script within the temporary folder storing the file, wherein the script is not executed within the hot folder;
   monitoring execution of the script; and
   deleting the temporary folder when the script related to the file in the temporary folder is done executing.

2. The method of claim 1, wherein the temporary folder includes a unique filename related to the file.

3. The method of claim 1, wherein executing the script includes creating temporary content.

4. The method of claim 3, further comprising deleting the temporary content along with the temporary folder.

5. The method of claim 1, wherein the invoking the script includes running the script as a specific user.

6. The method of claim 5, wherein the specific user limits access of the script to the file.

7. The method of claim 1, further comprising storing the file for the print job in the hot folder, wherein the hot folder is located at an external file server accessible by the DFE.

8. The method of claim 7, further comprising transferring the file for the print job to the DFE for processing from the hot folder.

9. The method of claim 1, further comprising keeping the file in the hot folder and using the file in the temporary folder as a work-in-progress file.

10. The method of claim 1, wherein storing the file includes moving the file to the temporary folder.

11. A method for performing printing operations using a hot folder, the method comprising:
    receiving, at the hot folder associated with a printing device, a plurality of files for print jobs to be printed at the printing device;
    processing the print jobs at a digital front end (DFE) of the printing device;
    invoking a script to be executed using the plurality of files within the hot folder;
    creating a temporary folder for each of the plurality of files,
      wherein each temporary folder includes a unique filename, and
      wherein the temporary folder is separate from the hot folder within the DFE;
    storing each of the plurality of files to the respective temporary folder with the script;
    suspending processing each of the plurality of files within the hot folder when the respective temporary folder is active;
    executing the script within the temporary folders storing the plurality of files, wherein the script is not executed within the hot folder;
    monitoring execution of the script within the temporary folders; and
    deleting each of the temporary folders when the script related to the file in each of the temporary folders is done executing in the temporary folder.

12. The method of claim 11, wherein executing the script within each of the temporary folders includes creating temporary content within the temporary folder.

13. The method of claim 12, further comprising deleting the temporary content along with the temporary folder.

14. The method of claim 11, wherein the invoking the script includes running the script as a specific user.

15. The method of claim 14, wherein the specific user limits access of the script to the plurality of files.

16. The method of claim 11, further comprising storing the plurality of files in the hot folder, wherein the hot folder is located at an external file server accessible by the DFE.

17. A printing system comprising:
a printing device having a digital front end (DFE); and
a storage device accessible by the DFE, wherein the storage device includes a processor and a memory connected to the processor, wherein the memory stores instructions that, when executed on the processor, configures the storage device to
receive, at the hot folder associated with a printing device, a file for a print job to be printed at the printing device;
process the print job at a digital front end (DFE) of the printing device;
invoke a script to be executed using the file within the hot folder;
create a temporary folder corresponding to the file, wherein the temporary folder is separate from the hot folder within the DFE;
store the file to the temporary folder with the script;
suspend processing of the file within the hot folder when the temporary folder is active;
execute the script within the temporary folder storing the file, wherein the script is not executed within the hot folder;
monitor execution of the script; and
delete the temporary folder when the script related to the file in the temporary folder is done executing.

18. The printing system of claim 17, wherein the storage device is external to the printing device.

* * * * *